3,217,874
PACKAGING FOR A PLURALITY OF
CONTAINERS
Nicholas B. Potter, New York, N.Y., assignor to Union
Carbide Corporation, a corporation of New York
Filed May 27, 1963, Ser. No. 283,213
4 Claims. (Cl. 206—65)

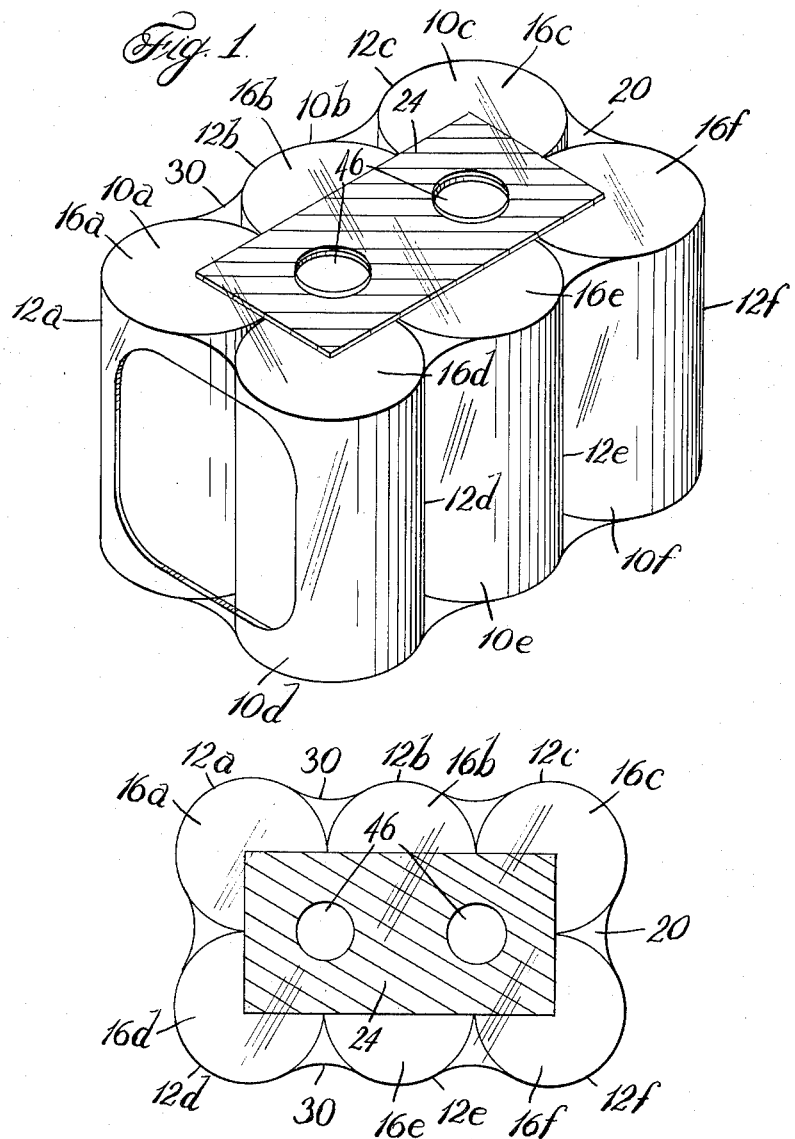

This invention relates to packaging. More particularly the invention relates to packaging two or more containers such as cans, bottles, spiral wound paperboard canisters, and the like. The invention relates in a particular aspect to an improved package for a plurality of containers wherein strength, durability, attractiveness and low unit cost are significant advantages over presently known multi-container packages. The invention further relates to method and apparatus for producing the multi-container package of the present invention.

Modern marketing techniques make extensive use of multi-container packages as a means of increasing sales, providing greater convenience to consumers, lowering shipping and handling costs and for special combination promotions. These packages have heretofore been fabricated of paperboard, appropriately scored and printed, which is fastened in some manner around the containers. It is essentially a duplicative cost to producers to print on the paper stock since the containers generally are printed as well. Opaque packaging, however, necessitates further printing. A further disadvantage of paperboard for multi-container packaging is the difficulty of providing product identification or advertising material at the ends of the package. The amount and cut of the paperboard necessary for end identification entails great additional expense. Failure to provide end covering can likely result in exposure of unsightly seam lines unless special, costly precautions are taken to properly orient end containers.

Multi-container packages using transparent packaging materials such as thermoplastic film are known such as sacks of frozen juice cans. The difficulty with this type of package is that the containers are not firmly maintained in relative position and therefore crash together during shipment resulting in dented or even broken-open containers.

Paperboard container packaging avoids this problem by providing separators between adjacent containers. These separators absorb the shocks of would-be container collisions and preserve the integrity of the containers during shipment. However, the provision of separators supported by sleeves, for example, entails additional expense both in material costs and in handling operations.

It is an object, therefore, of the present invention to provide multi-container packaging offering see-through-ability, waterproofness, toughness, container protection and attractiveness, at low cost.

It is another object to provide a multi-container package wherein individual containers are firmly maintained in relative position and are visible through the package.

It is another object to provide method for producing multi-container packaging.

It is still another object to provide apparatus for producing multi-container packaging.

The multi-container packaging of the present invention comprises a plurality of individual containers in juxtaposed arrangement and means for maintaining the containers in said juxtaposition comprising closely fitting heat shrunk thermoplastic film.

There is also provided method and apparatus for achieving multi-container packaging. The method comprises arranging a plurality of containers in juxtaposed relation, fastening, as by sealing heat shrinkable thermoplastic film around the juxtaposed containers, and shrinking and closely fitting said film against the juxtaposed containers by applying heat to said film.

The apparatus comprises means for positioning containers in juxtaposed relation, means for placing heat shrinkable thermoplastic film around the juxtaposed containers, means for fastening the thermoplastic film therearound and means for applying heat to the film after fastening.

In the drawings:
FIGURE 1 is an isometric view of a package for six containers; and
FIGURE 2 is a plan view of the package shown in FIGURE 1.

Referring now to the drawings in detail there is shown a plurality of six containers 10a, 10b, 10c, 10d, 10e and 10f such as beer cans, having walls 12a, 12b, 12c, 12d, 12e and 12f and ends 16a, 16b, 16c, 16d, 16e and 16f arranged in juxtaposed relation into three right and left hand pairs 10a and 10d, 10b and 10e, and 10c and 10f, and two trios 10a, 10b and 10c and 10d, 10e and 10f. As few as two and as many containers as desired can be similarly packaged.

The containers 10 are maintained in their arranged juxtaposition by a heat shrunk thermoplastic film 20. It will be noted the film 20 is individually contoured around the ends 16 of the containers 10. This is clearly shown by the indentations 30 in the film 20 between adjacent containers. The entire support for maintaining the containers in relative alignment thus is provided by the film 20. This results in a saving because no paperboard or other separators are used.

A further advantage of these packages is that they do not lose their strength when immersed in water, as can happen to conventional paperboard packages left in a beer cooler or in a mountain stream.

Thermoplastic film which can be used in the present invention comprises one or more synthetic organic thermoplastic polymers. Generally useful polymers are polymers of monoolefins, i.e. compounds having the formula R—CH=CH$_2$, wherein R is hydrogen, or an aromatic or aliphatic hydrocarbon group such as an aryl or alkyl group, particularly an alkyl group having from 1 to 8 carbon atoms, such as polyethylene, polypropylene, polystyrene, ethylene/propylene copolymers and like polymers; and copolymers of such olefins with one or more other compounds copolymerizable therewith which contain polymer producing unsaturation such as is present for example in carbon monoxide and in organic compounds containing olefinic unsaturation >C=C< e.g. vinyl chloride, butene, vinyl acetate, methyl methacrylate, monobutyl maleate, 2-ethyl hexyl acrylate, N-methyl-N-vinyl acetamide, methacrylic acid, ethyl acrylate, acrylic acid, isoprene, acrylamide, vinyl triethoxysilane, bicycloheptane, divinyl phosphonate and the like, as well as other types of polymers including polycarbonates and condensation products of equimolar amounts of dihydric phenols and mono and/or diepoxides, the thermoplastic polyhydroxyethers.

The term "heat shrinkable" as used herein refers to the property of a film whereby it contracts in length and/or width upon exposure to sufficient heat. Shrinking is generally attributable to a reorientation of molecules which were previously oriented by stretching the film either uniaxially longitudinally (machine direction) or horizontally (transverse direction) or biaxially (both directions). The amount of shrinkability in the film is not critical, the only requirement being that the film fit closely to the containers after shrinking.

The term "heat shrunk" describes the condition of a heat shrinkable material after application thereto of heat sufficient to cause shrinkage.

A reinforcing strip 24, preferably extending over a portion of each container top 16a etc. is provided bonded to the film 20 to permit carrying of the package without tearing the film 20. Conveniently strip 24 can be used as a tear strip. Strip 24 is preferably thermoplastic film.

In the method of the invention a plurality of containers are carried along a predetermined path which can be a pair of moving belts or other transport means to an arranging zone such as an indexer where the containers are arranged in the desired juxtaposed relation. Typically this relation is three rows of containers two abreast. The arranged containers are moved along a path away from the arranging station to a wrapping station where heat shrinkable thermoplastic film from a supply roll is placed around the arranged containers. The film wrap can be parallel to the longitudinal axis of the arranged containers or other arrangements can be used, provided the ends of the outermost containers are within the volume delimited by the heat shrinkable film. It is preferred to provide a finger grip such as two holes indicated by the numeral 46 in the drawings, by perforating the film at the interstices between containers, preferably with a hot punch. The heat shrinkable film wrapped containers are then passed through a heating zone such as a shrink tunnel where heat sufficient to shrink the film is applied to the film. The arranged containers held endwise and sidewise by the heat shrunk film are then passed to a distribution area.

What is claimed is:

1. Multi-container package comprising a plurality of individual containers held in juxtaposed arrangement by heat-shrunk thermoplastic film closely fitting about said containers and a separate reinforcing strip bonded to said heat-shrunk film and contacting a single surface thereof extending over a portion of each container, said strip and said film having superimposed finger receiving holes therein for carrying said packaging.

2. Packaging claimed in claim 1 wherein the thermoplastic film is polypropylene.

3. Multi-container package comprising a plurality of individual containers held in juxtaposed arrangement by heat-shrunk thermoplastic film closely circumscribing the arranged containers sidewise and embracing them endwise and a separate thermoplastic film reinforcing strip bonded to said heat-shrunk film and extending over a portion of each container, said films having superimposed finger receiving holes therein for carrying said packaging.

4. The packaging of claim 3 having a plurality of cans arranged in two rows of threes.

References Cited by the Examiner
UNITED STATES PATENTS

| | | | |
|---|---|---|---|
| 1,190,492 | 7/1916 | Way | 229—54 |
| 2,554,841 | 5/1951 | Ramsey | 206—45.33 |
| 2,699,285 | 1/1955 | Bell et al. | 229—51 |
| 2,851,210 | 9/1958 | Kramer et al. | 229—40 |
| 2,881,946 | 4/1959 | Bosrock et al. | 220—113 |
| 2,952,395 | 9/1960 | Spees | 229—51 |
| 2,982,400 | 5/1961 | Andre | 206—65 |
| 3,087,610 | 4/1963 | Kirkpatrick | 206—65 |
| 3,111,221 | 11/1963 | Chapman et al. | 206—65 |
| 3,118,537 | 1/1964 | Copping | 206—65 |

THERON E. CONDON, *Primary Examiner.*

GEORGE O. RALSTON, *Examiner.*